(12) United States Patent
Gilboa et al.

(10) Patent No.: US 8,725,941 B1
(45) Date of Patent: May 13, 2014

(54) DETERMINING EFFICIENCY OF A VIRTUAL ARRAY IN A VIRTUALIZED STORAGE SYSTEM

(75) Inventors: Ran Gilboa, Cambridge, MA (US); Barry S. Kleinman, Tewksbury, MA (US); Anton Sergeev, Lexington, MA (US)

(73) Assignee: Netapp, Inc., Sunnyvale, CA (US)

( * ) Notice: Subject to any disclaimer, the term of this patent is extended or adjusted under 35 U.S.C. 154(b) by 385 days.

(21) Appl. No.: 13/267,736

(22) Filed: Oct. 6, 2011

(51) Int. Cl.
*G06F 12/08* (2006.01)
*G06F 12/10* (2006.01)
*G06F 3/06* (2006.01)

(52) U.S. Cl.
CPC ............ *G06F 12/08* (2013.01); *G06F 12/0833* (2013.01); *G06F 12/1036* (2013.01); *G06F 3/0646* (2013.01); *G06F 3/0653* (2013.01)
USPC ............................. 711/114; 711/156; 711/203

(58) Field of Classification Search
CPC . G06F 12/08; G06F 12/0833; G06F 12/1036; G06F 3/0646; G06F 3/0653
USPC .......................................... 711/114, 156, 203
See application file for complete search history.

(56) References Cited

U.S. PATENT DOCUMENTS

| | | | |
|---|---|---|---|
| 5,881,311 A * | 3/1999 | Woods ............................. | 710/4 |
| 6,654,307 B2 * | 11/2003 | Widmer et al. ........... | 365/230.03 |
| 7,715,377 B2 * | 5/2010 | Mick et al. .................... | 370/371 |

* cited by examiner

*Primary Examiner* — Reba I Elmore
(74) *Attorney, Agent, or Firm* — Kacvinsky Daisak Bluni PLLC

(57) ABSTRACT

A virtualized storage system comprises at least one host, at least one virtual array, a backend array and a management server. The host requests storage operations to the virtual array, and the virtual array executes storage operations for the host. The backend array, coupled to the virtual array, comprises physical storage for the virtual array. The management server determines the efficiency for the virtual array. The management server determines an input throughput data rate between the host and the virtual array based on storage operations between host and virtual array. The management server also determines an output throughput data rate, from the virtual array to the backend array. The output throughput data rate is based on the storage operations that require access to the backend array. The management server determines the efficiency of the virtual array using the input throughput data rate and the output throughput data rate.

19 Claims, 7 Drawing Sheets

| Name | Storage | Capacity (GB) | IOPs Efficiency (%) | IOPs | Backend IOPs | Backend IOPs Max | Capacity (GB) | Backend Capacity |
|---|---|---|---|---|---|---|---|---|
| E313-1 | USP10148-... | 50.0 | 28% | 81 | 58 | 518 | 450.00 | 450.00 |
| E313-10 | USP10148-... | 50.0 | 6% | 31 | 29 | 499 | 600.00 | 600.00 |
| E313-4 | USP10148-... | 16.0 | 45% | 31 | 17 | 494 | 50.00 | 50.00 |
| E313-6 | USP10148-... | 20.0 | 42% | 31 | 18 | 458 | 50.00 | 50.00 |
| E313-7 | USP10148-... | 50.0 | 33% | 63 | 42 | 458 | 1,024.00 | 1,024.00 |
| E314-1 | USP10148-... | 50.0 | 44% | 41 | 23 | 432 | 250.00 | 250.00 |
| E314-4 | USP10148-... | 16.0 | 44% | 41 | 23 | 416 | 50.00 | 50.00 |
| E314-6 | USP10148-... | 50.0 | 28% | 32 | 23 | 402 | 250.00 | 250.00 |
| E314-7 | USP10148-... | 50.0 | 48% | 31 | 16 | 379 | 50.00 | 50.00 |
| E314-9 | USP10148-... | 250.0 | 52% | 58 | 28 | 378 | 175.00 | 175.00 |
| E315-1 | USP10148-... | 100.0 | 17% | 24 | 20 | 376 | 400.00 | 400.00 |
| E315-10 | USP10148-... | 50.0 | 17% | 6 | 5 | 376 | 472.00 | 472.00 |

FIG. 6

DETERMINING EFFICIENCY OF A VIRTUAL ARRAY IN A VIRTUALIZED STORAGE SYSTEM

FIELD OF THE INVENTION

The present disclosure is related to the field of storage systems, and in particular, for determining the efficiency of virtualized arrays in a virtualized storage system.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a storage device assembly directly attached to a client or host computer. The storage devices typically include storage device drives organized as a storage device array. In one embodiment, the storage device comprises hard disk drives, wherein the term "disk" commonly describes a self-contained rotating magnetic media storage device. The term storage device in this context is synonymous with hard disk drive (HDD) or direct access storage device (DASD). However, the storage device may comprise any type of device capable of storing data.

The storage operating system of the storage system may implement a high-level module, such as a file system, to logically organize the information stored on volumes as a hierarchical structure of storage objects, such as files and logical unit numbers (LUNs). A known type of file system is a write-anywhere file system that does not overwrite data on storage devices. An example of a write-anywhere file system that is configured to operate on a storage system is the Write Anywhere File Layout (WAFL®) file system available from NetApp, Inc. Sunnyvale, Calif.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many servers. In some embodiments, the storage system architecture provides one or more aggregates, each aggregate comprising a set of one or more storage devices (e.g., disks). Each aggregate may store one or more storage objects, such as one or more volumes. The aggregates may be distributed across a plurality of storage systems interconnected as a cluster. The storage objects (e.g., volumes) may be configured to store content of storage objects, such as files and logical unit numbers, served by the cluster in response to multi-protocol data access requests issued by servers.

Although this storage system architecture is capable of servicing many servers or hosts, adding more hardware may not suffice in addressing the need for more storage capacity. Often times data center space available for storage systems has not kept pace with increased need. The rapid increase in storage device capacity has helped; but even with this growth, real estate remains a limiting factor. Storage virtualization has emerged as an important strategy in addressing this problem. Storage virtualization abstracts the logical storage of data from its physical location. The available space on physical storage devices in a system is assigned to virtual pools to which hosts (or servers) can be attached. Virtualization can result in much more efficient and flexible usage of storage capacity; it can, for example, enable such capabilities as adding capacity on the fly and changing the allocation of storage capacity to computing device on an as-needed basis.

SUMMARY OF THE INVENTION

A virtualized storage system comprises at least one host for requesting storage operations to at least one virtual array. The virtual array executes storage operations for the host. A backend array, coupled to the virtual array, comprises physical storage. The backend array provides data storage for the virtual array. The virtualized storage system also comprises at least one management server. In general, the management server determines the efficiency for the virtual array. In one embodiment, the management server determines an input throughput data rate between the host and the virtual array based on storage operations between the host and the virtual array. The management server also determines an output throughput data rate, from the virtual array to the backend array. The output throughput data rate is based on the storage operations that require access to the backend array. The management server then determines the efficiency of the virtual array using the input throughput data rate and the output throughput data rate.

In some embodiments, the management server determines the efficiency of the virtual array by querying each host, coupled to the virtual array, to determine a throughput data rate for the corresponding host, and then aggregating the throughput data rates for the hosts to obtain the input throughput data rate. Similarly, to obtain the output throughput data rate, the management server queries each physical storage unit in the backend array, to determine a throughput data rate for the corresponding physical storage unit, and then aggregates the throughput data rates to obtain the output throughput data rate. The efficiency of the virtual array is calculated by dividing the input throughput data rate by the output throughput data rate. In some embodiments, the efficiency of the virtual array is determined by generating a product of the input throughput data rate and the inverse function of the output throughput data rate, which may be expressed as (input throughput data rate)×(1/output throughput data rate). In some embodiments, the efficiency of the virtual array is calculated as a percentage of the storage operations that do not require access to the backend array.

BRIEF DESCRIPTION OF THE DRAWINGS

The novel features of the invention are set forth in the appended claims. However, for purpose of explanation, several embodiments of the invention are set forth in the following figures.

FIG. 6 illustrates an exemplary output display that shows parameters of a virtualized storage system.

DETAILED DESCRIPTION

Figure 1:
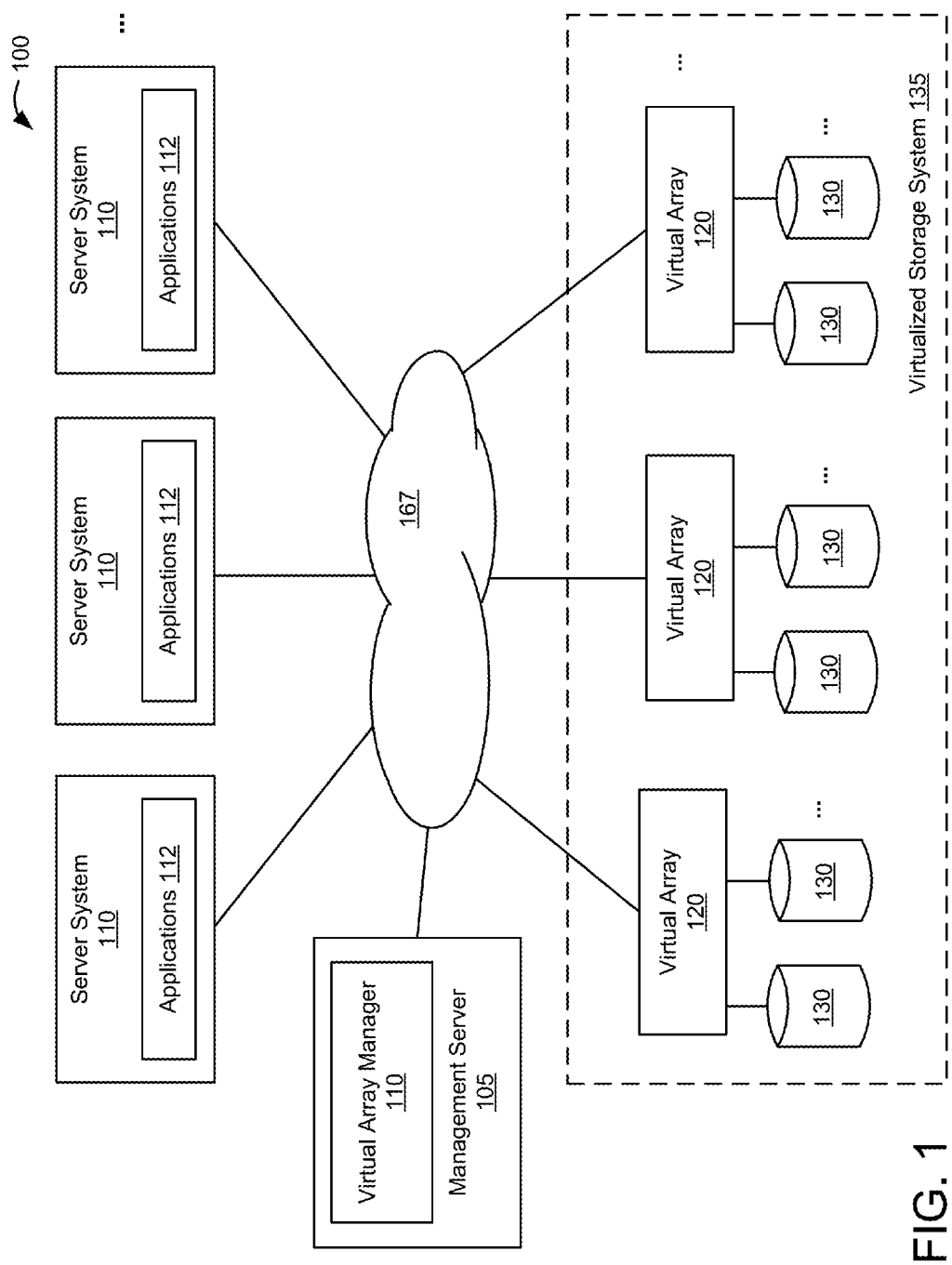
FIG. 1 is a schematic block diagram of an exemplary storage system environment 100 in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I contains terms used herein. Section II describes a virtualized storage system environment in which some embodiments operate. Section III describes a system for measuring and reporting the efficiency of virtualized arrays.

I. Terms

Storage object: As used herein, a storage object comprises any type of container for storing data. Examples of storage objects include, but are not limited to, files, LUs, qtrees, volumes, flexible volumes, aggregates, storage devices, etc. For illustrative purposes, the embodiments below are described in relation to a flexible volume, e.g., base flexible volume, flexible volume clone, flexible volume clone hierarchy, etc. However, in other embodiments, any other type of storage object may be used in the embodiments below.

Cluster storage system: As used herein, a cluster storage system may comprise a set of one or more storage systems. In some embodiments, the cluster may comprise one storage system. As such, the terms "cluster" and "storage system" may sometimes be used interchangeably. In other embodiments, a cluster comprises a plurality of storage systems.

Flexible volume: As used herein, a flexible volume may comprise a type of storage volume that may be efficiently distributed across a plurality of storage devices and may be resized to meet changing business or application requirements. In some embodiments, a storage system may provide one or more aggregates and one or more storage volumes distributed across a plurality of nodes interconnected as a cluster. Each of the storage volumes may be configured to store data such as files and logical units. As such, in some embodiments, a flexible volume may be comprised within a storage aggregate and further comprises at least one storage device. The storage aggregate may be abstracted over a RAID plex where each plex comprises a RAID group. Moreover, each RAID group may comprise a plurality of storage devices (e.g., disks). As such, a flexible volume may comprise data storage spread over multiple storage devices.

Base flexible volume: As used herein, a base flexible volume comprises a volume that is not a clone of a flexible volume. For example, a base flexible volume may be a flexible volume that has been cloned. As such, a base flexible volume may be considered to be a base volume that is depended upon by at least one flexible volume clone. The flexible volume clone may be considered to be a child flexible volume.

Virtual Volume Block Number: As used herein, a virtual volume block number (VVBN) may specify a data block's offset within a storage object. For example, a virtual volume block number may comprise a block address within a flexible volume's virtual block address space. In some embodiments, the virtual volume block number may comprise a block address within a flexible volume clone's virtual block address space. As such, a virtual volume block number may comprise a virtual address pointer.

Physical Volume Block Number: As used herein, a physical volume block number (PVBN) may specify a data block's location within a storage aggregate. For example, a physical volume block number may specify a location within a storage aggregate for a data block of a flexible volume. In some embodiments, the physical volume block number may specify a location or address within a storage aggregate for a data block of a flexible volume clone. As such, a physical volume block number may comprise a physical address pointer.

II. Virtualized Array Storage System Environment

FIG. 1 is a schematic block diagram of an exemplary storage system environment 100 in which some embodiments operate. The environment 100 comprises a set of one or more server systems 110, a virtualized storage system 135 comprising a set of one or more virtual arrays 120, and a management server 105 that are connected via a connection system 167. Each virtual array 120 is coupled to physical storage, such as a set of one or more storage devices 130. The connection system 167 may comprise a network, such as a Local Area Network (LAN), Wide Area Network (WAN), metropolitan area network (MAN), the Internet, or any other type of network or communication system between computer systems.

Each virtual array 120 may comprise hardware and/or software components for providing storage services. Each virtual array 120 may have a distributed architecture. For example, each virtual array 120 may include separate N module (network module) and D module (data module) components (not shown). In such an embodiment, the N module is used to communicate with the server systems 110, while the D module includes the file system functionality and is used to communicate with the storage devices 130. In another embodiment, the storage server 108 may have an integrated architecture, where the network and data components are all contained in a single box or unit. The virtual array 120 may be coupled through a switching fabric (not shown) to other virtual arrays 120 in the virtualized storage system 135. In this way, all the virtual arrays 120 of the virtualized storage system 135 may be interconnect to form a single storage pool that may be accessed by the connected server systems 110.

The virtual arrays 120 and storage devices 130 comprise functional components that cooperate to provide a distributed storage system architecture providing consolidated data services to the server systems 110. In some embodiments, a server system 110 may comprise a computer system that utilizes services of the virtualized storage system 135 to store and manage data in the storage devices 130 of the virtual array 120. Interaction between a server system 110 and a virtual array 120 can enable the provision of storage services. That is, server system 110 may request the services of the virtual array 120, and the virtual array 120 may return the results of the services requested by the server system 110, by exchanging packets over the connection system 167. The server system 110 may request the services of the virtualized storage system 135 by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The virtualized storage system 135 may comprise one or more computer systems that stores data in a set of storage devices 130, preferably on one or more writable storage device media (such as magnetic storage devices, video tape, optical, DVD, magnetic tape, and any other similar media adapted to store information, including data and parity information). The virtual array 120 may implement a file system to logically organize the data as storage objects on the storage devices 130. A server system 110 may execute one or more applications 112 that submit access requests to a virtual array 120 for accessing particular storage objects on the storage devices 130.

III. Measuring and Reporting the Efficiency of Virtualized Arrays

Figure 2:
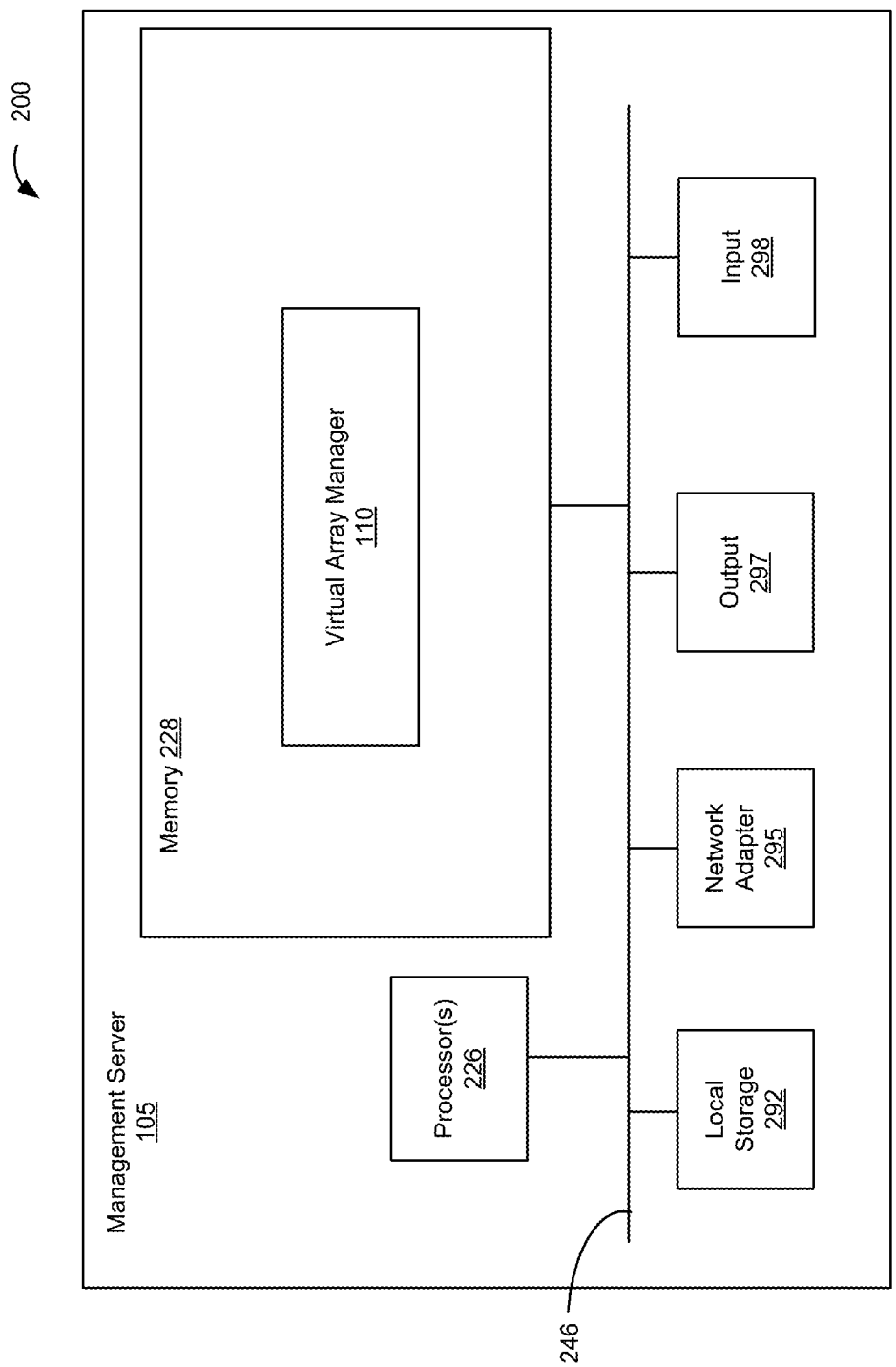
FIG. 2 is a schematic block diagram 200 of an exemplary management server 105 that may be employed in the storage system environment of FIG. 1.

FIG. 2 is a schematic block diagram 200 of an exemplary management server 105 that may be employed in the storage system environment of FIG. 1. As described more fully below, the management server 105 may operate software as a management tool for the virtualized storage system 135. The management server 105 comprises server processor(s) 226, server memory 228, a server local storage 292, a server network adapter 295, an output component 297, and an input component 298 coupled by a bus 246.

The server processors 226 are the central processing units (CPUs) of the management server 105 and, thus, control the overall operation of the management server 105. Server processors 126 may include one or more programmable general-purpose or special-purpose microprocessors, digital signal processors (DSPs), programmable controllers, application specific integrated circuits (ASICs), programmable logic devices (PLDs), or the like, or a combination of such devices. The server network adapter 295 comprises a plurality of ports adapted to couple the management server 105 to one or more other computer systems (such as servers 110 or storage systems 100) over point-to-point links, wide area networks, virtual private networks implemented over a public network (Internet) or a shared local area network. The server network adapter 295 thus may comprise the mechanical, electrical and signaling circuitry needed to connect the storage system to the network.

The output component 297 may be of any type generally used by a computer system to provide information (e.g., user interface) to an end user (e.g., storage system administrator). For example, the output component 297 could include a monitor, an audio speaker, or an alphanumeric display. Similarly, the input component 498 may be of any type that allows an end user to provide input into a computer system. For example, the input component 298 may be a keyboard, a mouse, or a speech recognition system.

Server memory 228 can be a random access memory (RAM), a read-only memory (ROM), or the like, or a combination of such devices. It will be apparent to those skilled in the art that other processing and memory means, including various computer readable media, may be used for storing and executing program instructions pertaining to the embodiments described herein. Server memory 228 comprises storage locations that are addressable by the processor 226 and adapters for storing software program code, such as software described herein. The server processor 226 and server adapters may, in turn, comprise processing elements and/or logic circuitry configured to execute the software code. Such software code may include a virtual array manager 110. In some embodiments, the various modules may configure hardware components of the management server 105 to produce a virtual array manager 110.

Server local storage 292 is a storage device that stores data needed by the virtual array manager 110 for performing the embodiments described herein. Such data may include all storage volumes, storage volume types, parent volumes, and clone volumes. The management server 105 loads data stored on the server local storage 292 into server memory 228 from which they are accessed by server processors 226. The server local storage 292 may also store data produced by the virtual array manager 110 upon performing the embodiments described herein.

In some embodiments, virtual array manager 110, for performing the embodiments described herein, reside and execute on the management server 105 which is external and separate from the server system 110 and virtual array 120. In other embodiments, the virtual array manager 110 may be distributed and reside and execute on one or more servers 110 and/or one or more virtual arrays 120.

The virtual array manager 110 may be configured to perform management functions on the one or more virtual arrays 120. In some embodiments, virtual array manager 110 may receive information about the servers systems 110, virtual arrays 120 and storage devices 130. The virtual array manager 110 may aggregate the received information. The received information may be stored into a data structure.

Figure 3:
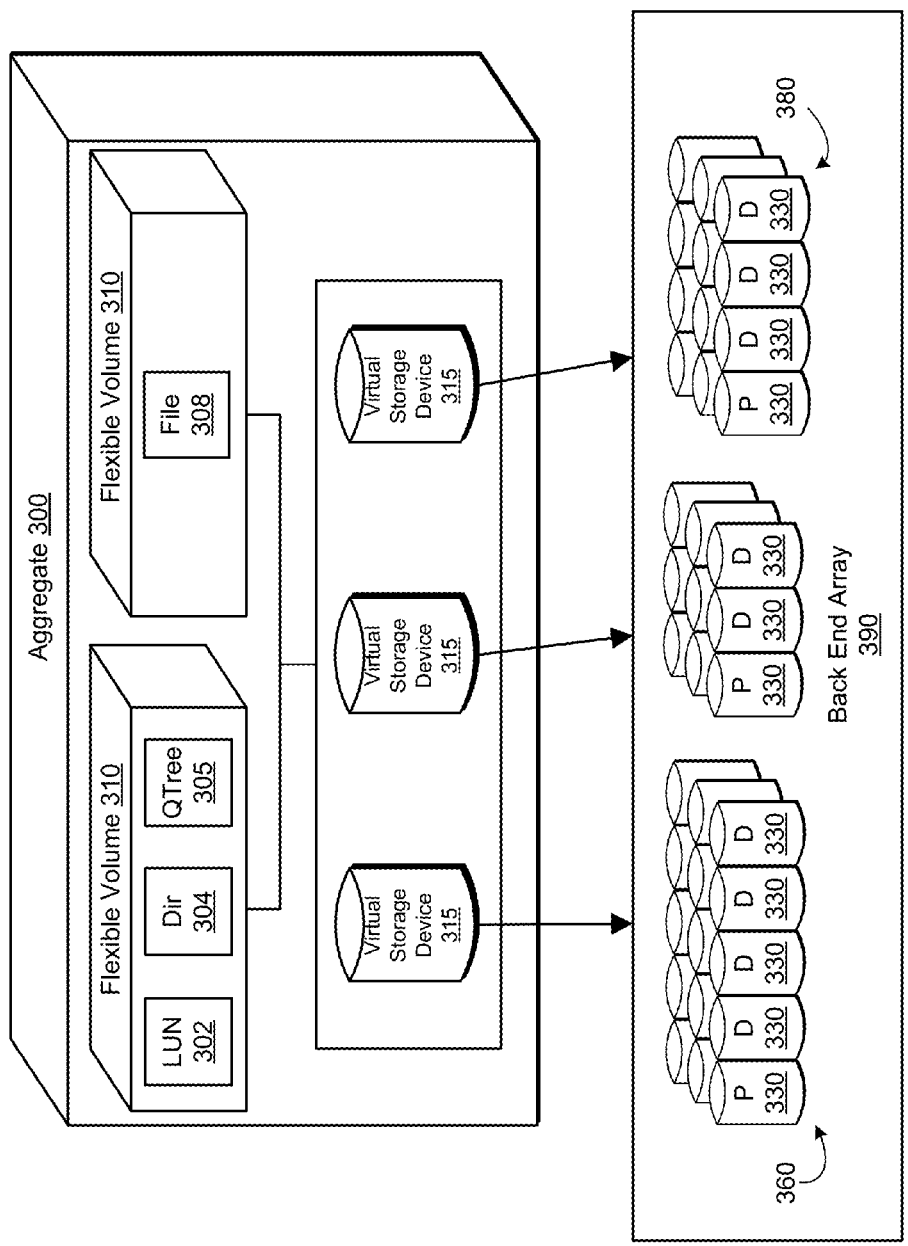
FIG. 3 is a schematic block diagram of an embodiment of an aggregate 300 (storage pool) that may be used in some embodiments.

FIG. 3 is a schematic block diagram of an embodiment of an aggregate 300 (storage pool) that may be used in some embodiments. The total storage space of an aggregate 300 may be allocated among a set of one or more flexible volumes 310. A flexible volume 310 may be dynamically increased or decreased in storage size within the total storage space of the aggregate 300. Each flexible volume 310 may comprise one or more storage objects, such as, LUNs (blocks) 302, directors 304, qtrees 306, files 308, etc. The flexible volume 310 is illustratively layered on top of virtual devices 315. For illustrative purposes, in the embodiments described below, a virtual device comprises a virtual storage device. In other embodiments, however, another type of virtual device may be used. The flexible volume 310, such as LUNs, map to a corresponding virtual storage device 315.

In general, storage virtualization abstracts storage, separating out logical data access from physical access. As such, the aggregate 300 provides the bridge between one or more physical storage arrays, through one or more storage virtualization methods that present logical elements to the host. In some embodiments, the virtualized storage system 135 employs a virtual LUN to mask its backend physical complexity (e.g., storage devices 130). This effectively delivers storage as if it originated from a single device (e.g., virtual storage device 315), even though several storage devices (330) are actually being used.

Figure 4:
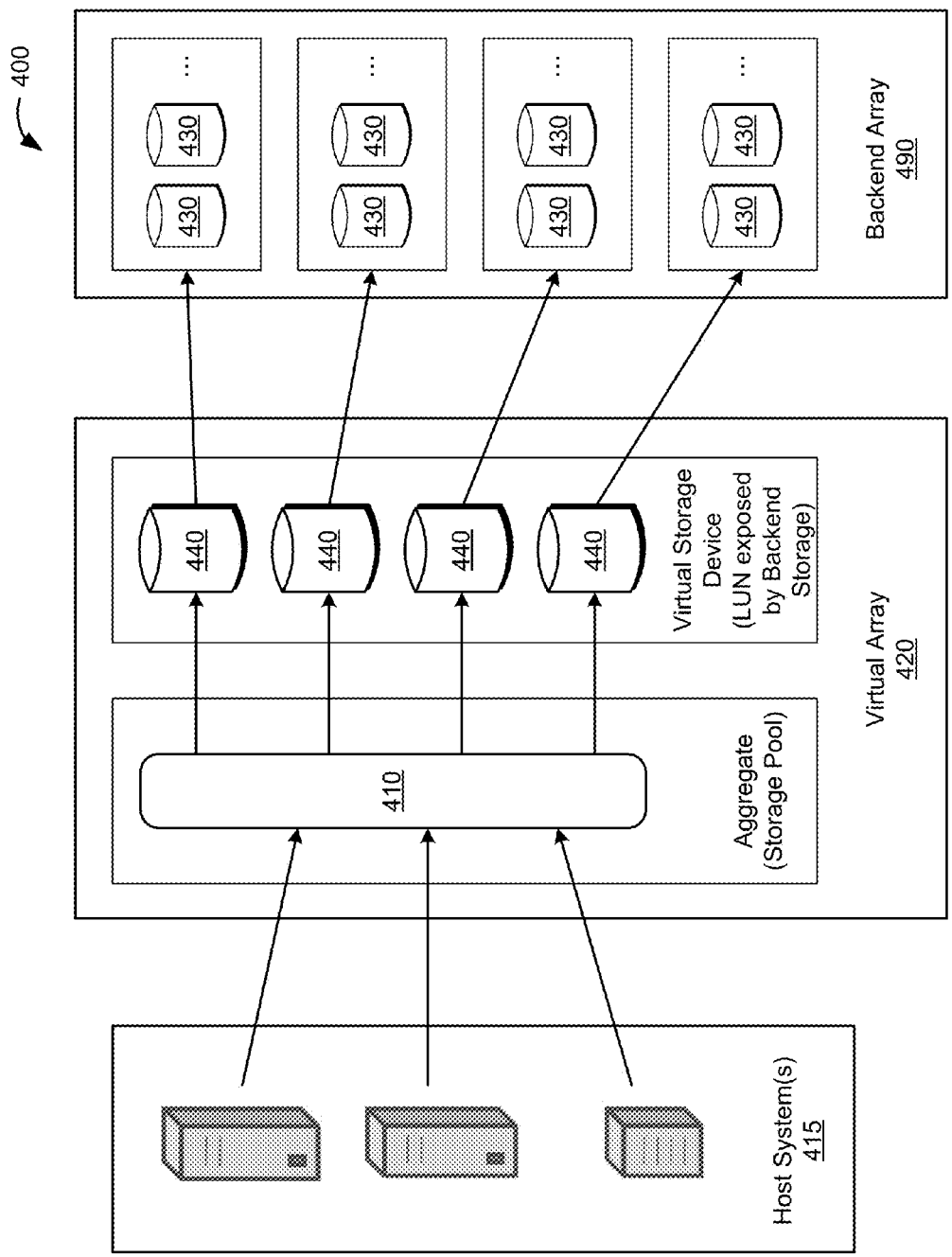
FIG. 4 is a block diagram illustrating one embodiment for a virtualized array.

FIG. 4 is a block diagram illustrating one embodiment for a virtualized array. As shown in FIG. 4, in general, host systems 415 accesses aggregate (storage pool) 410 for data operations (i.e., read and write operations to a storage system). The host systems 415 may comprise a host of the storage system, a server system, such as server system 110, a tape system or another virtual array. In one embodiment, the host system presents itself to the virtual array 420 as a logical unit number "LUN" or share client, referred to herein as a "LUN/Share." In turn, the aggregate 410 maps the request to a virtual storage device 440 corresponding to the LUN. In turn, the virtual storage device is mapped to physical storage in the backend array 490. In some embodiment, the virtual array comprises a cache (not shown) to service data operations. For example, in response to a read operation request from the host system 415, the virtual array 420 determines whether the requested data is cached. If the requested data is cached, then the virtual array 420 returns the data to the host system 415 and, consequently, a read operation is not requested from the backend array 490. Alternatively, if the requested data is not cached, then the virtual array 420 accesses the appropriate storage device 430 in the backend array 490.

In some embodiments, the virtual array 420 may comprise a virtual array manufactured by NetApp, Inc. Sunnyvale, Calif., such as V-Series, or other virtual arrays, such as SVC by IBM Corp. or USP-V manufactured by Hitachi. The backend array 490 may be implemented by any well-known storage devices used to construct backend arrays. However, any backend array may be used without deviating from the spirit or scope of the invention.

Figure 5:
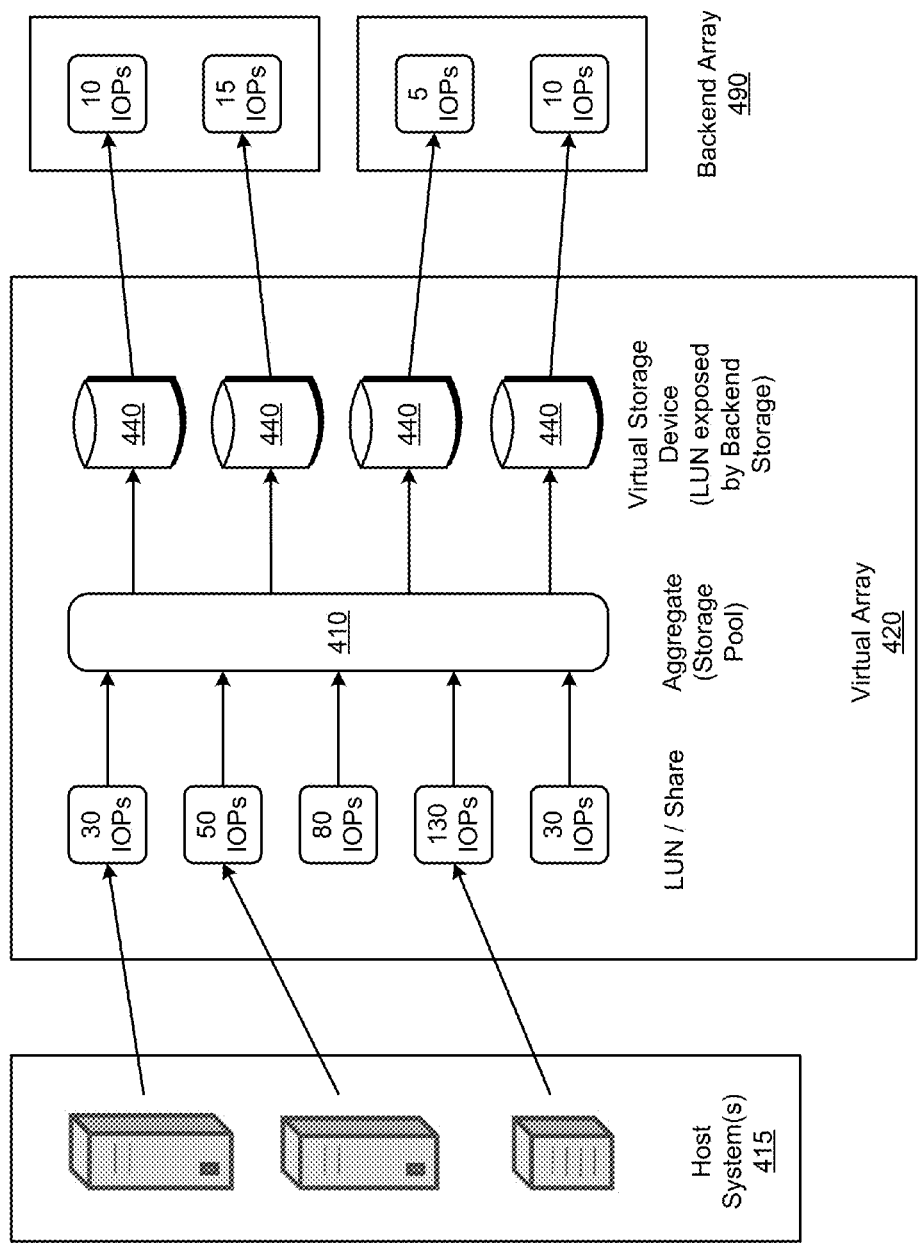
FIG. 5 is a block diagram of a virtualized storage system configured in accordance with one embodiment.

FIG. 5 is a block diagram of a virtualized storage system configured in accordance with one embodiment. FIG. 5 illustrates the virtualized storage system 135 of FIG. 4, however FIG. 5 illustrates an example snapshot of performance specifications. Specifically, FIG. 5 illustrates input throughput data rates to the virtual array 420 from the host systems 415. The input throughput data rates are a measurement of the rate that the host systems 415 request storage operations to the virtual array 420. For the example illustrated in FIG. 5, the input throughput data rates, measured in input/output operations per second (IOPs), are 30, 50, 80, 130 and 30 IOPs. FIG. 5 also illustrates output throughput data rates from the virtual array 420 to the backend array 490. The output throughput data rates are a measurement of the rate that the virtual array 420 requests storage operations to the backend array 490. For the example illustrated in FIG. 5, the output throughput data rates, also measured in input/output operations per second (IOPs), are 10, 15, 5, and 10 IOPs.

A comparison of the input throughput data rates, flowing into the virtual array 420, with the input throughput data rates, flowing into the backend array 490, provides a means to measure the efficiency of the virtual array 420. In one embodiment, the efficiency of a virtual array is measured by calculating a percentage of operations that do not require access to the backend array. In other words, for this embodiment, an efficiency of a virtual array is a measure of the percentage of storage operations requested by the host system that were serviced solely within the virtual array (i.e., no operation to the backend array was necessary). In one embodiment, to calculate the efficiency of the virtual array, the input throughput data rates into the virtual array 420 are added. Similarly, the input throughput data rates, flowing into the backend array, are added. Then, "1" is subtracted from the sum of the input throughput data rates in the virtual array divided by the sum of the input throughput data rates in to the backend array. The general expression for the calculation of the efficiency of the virtual array follows.

Efficiency of the Virtual Array=1−Sum of Input Throughput Data Rates on Virtual Storage Aggregate/Sum of Input Throughput Data Rates on Backend accessed LUNs For the example illustrated in FIG. 5, the efficiency of the virtual array is calculated by:

Efficiency of the Virtual Array=1−(30+50+80+130+30)/(10+15+5+10)

Efficiency of the Virtual Array=87.5%

Thus, for the example illustrated in FIG. 5, 87.5% of the storage operations requested by the host systems were fulfilled in the virtual array.

FIG. 6 illustrates an exemplary output display that shows parameters of a virtualized storage system. In some embodiments, the output display is generated by software running as part of a virtual array manager (e.g., virtual array manager 110). As discussed above, the virtual array manager 110 permits a user, such as a storage system administrator, to manage various aspects of the virtualized storage system. For the embodiment shown in FIG. 6, a first column, labeled "name", identifies the virtualized storage system. The column labeled "IOPs" displays the aggregate input throughput data rate (e.g., the data rate between the host systems and the virtual array). The column labeled "Backend IOPs", displays the aggregate output throughput data rate (e.g., the data rate between the virtual array and the backend storage). The column labeled "IOPs Efficiency" displays the efficiency of the virtual array, as described above. For example, the "E313-1" exhibits a 28% efficiency (i.e., 1−58/81=28%).

The virtual manager 110, by calculating the efficiency of the virtual array, permits a storage manager to manage, troubleshoot and optimize the virtualized storage system. In some embodiments, the storage manager may draw conclusions from the efficiency of the virtual array:

The efficiency of the virtual array is too low, perhaps optimizations can be made in the virtual array to improve efficiency;

The efficiency of the virtual array is high, and thus the throughput data rates to the backend array are low. As such, perhaps the storage devices of the backend array may be downgraded to lower performance devices for a cost savings; and The efficiency of the virtual array is low, and thus the throughput data rates to the backend array are high. As such, the storage devices of the backend array must remain high performance devices.

In some embodiments, the efficiency of the virtual array may be used to compare efficiencies between the virtual arrays (e.g., why is one virtual array efficient and another is not).

In some embodiments, the efficiency of the virtual array may also be used to troubleshoot. If the efficiency of the virtual array is high and thus the throughput between the host systems and the virtual array is low, then the storage system manager knows that the problem is within the virtual array.

As shown in FIG. 6, in some embodiments, the virtual manager 110 also displays the maximum backend IOPs. With this information, the storage system manager may optimize the storage system. For example, if the virtual array efficiency is high but the maximum throughput data is also high, downgrading the performance of the storage devices on the backend array may not be permissible.

Figure 7:
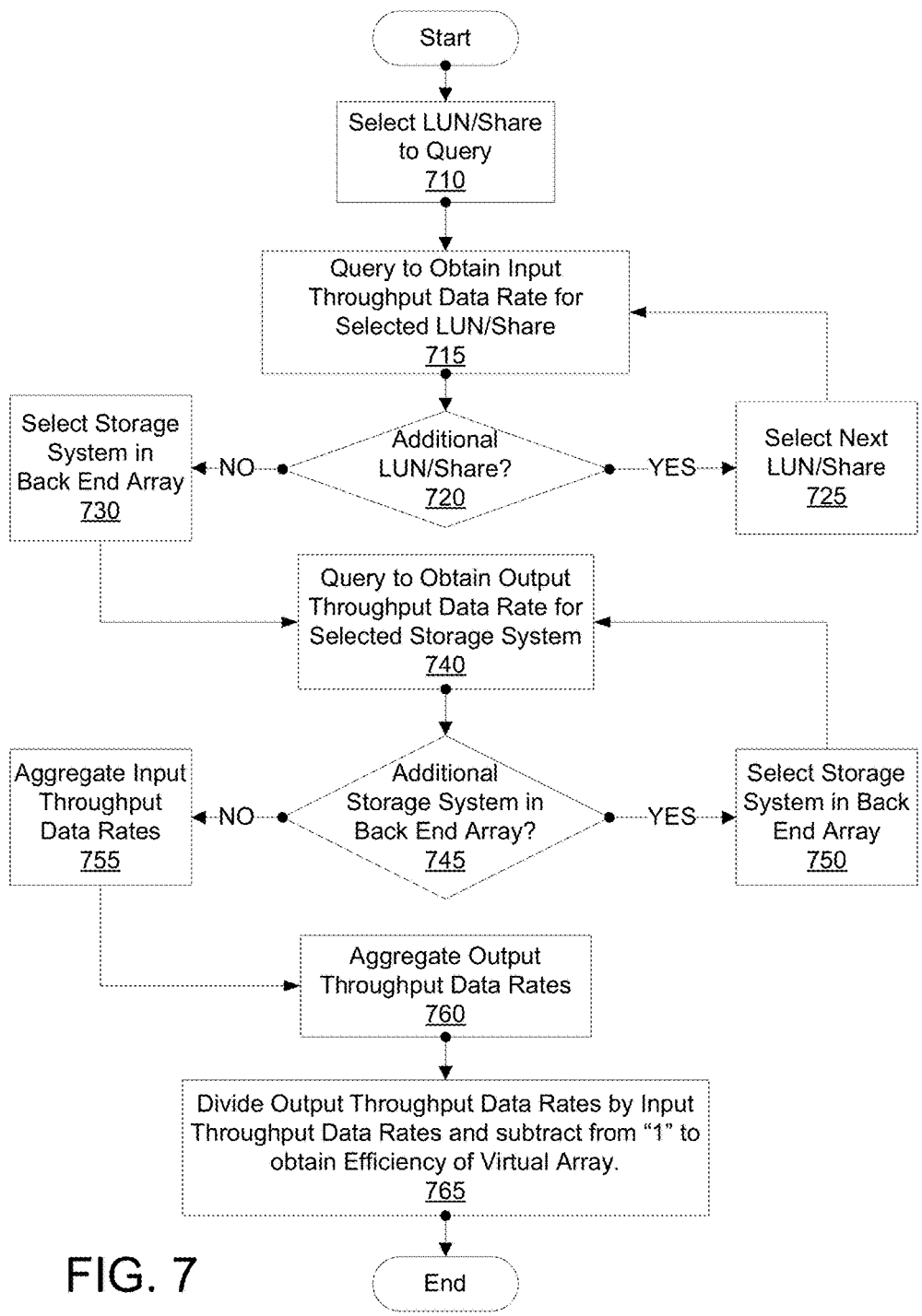
FIG. 7 is a flow diagram illustrating one embodiment for calculating efficiencies in a virtualized storage system.

FIG. 7 is a flow diagram illustrating one embodiment for calculating efficiencies in a virtualized storage system. In some embodiments, the process of FIG. 7 is executed in the virtual manager 110 (e.g., software running on management server 105). First, a LUN/share is selected (710) and queried to determine the input throughput data rate 715. In some embodiments, the virtual manager, running on the management server 105, calls an application program interface ("API") on the virtual array (or host system) to determine the input throughput data rate. If there is additional LUN/Shares, then the next LUN/Share is selected (725), and queried to determine the input throughput data rate 715. If there are no more LUN/Share (i.e., input throughput data rates), then a storage system on the backend array is selected (730) and queried to determine the output throughput data rate (740). In some embodiments, the virtual manager calls an application program interface ("API") on the storage system of the backend array to determine the output throughput data rate. If there are one or more additional storage systems in the backend array, then the next storage system is selected (750) and queried to determine the output throughput data rate (740). If there are no more storage systems in the backend array (i.e., output throughput data rates), then the input and the output throughput data rates are aggregated (755, 760). Then, the efficiency of the virtual array is calculated by dividing the output throughput data rates by the input throughput data rates and subtracting from "1" (765). In some embodiments, the efficiency of the virtual array is determined by generating a product of the input throughput data rate and the inverse function of the output throughput data rate, which may be expressed as (input throughput data rate)×(1/output throughput data rate).

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of storage device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The modules, algorithm, techniques, processes, or methods described in connection with embodiments disclosed herein may be embodied directly in computer hardware configured to perform the embodiments disclosed herein, in software executed by a processor, or in a combination of the two. In some embodiments, any software application, program, tool, module, or layer described herein may comprise an engine comprising hardware, software, or a combination of the two configured to perform embodiments described herein. In general, functions of a software application, program, tool, module, or layer described herein may be embodied directly in hardware, or embodied as software executed by a processor, or embodied as a combination of the two.

A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A non-transitory computer readable medium comprising a plurality of instructions, which when executed by a processor, determine an efficiency of a virtual array, the instructions for:
    determining an input throughput data rate between at least one host and a virtual array based on storage operations between the host and the virtual array;
    determining an output throughput data rate, from the virtual array to a backend array, comprising physical storage, of the storage operations, wherein the output throughput data rate is based on the storage operations that require access to the backend array; and
    determining an efficiency between the input throughput data rate and the output throughput data rate so as to measure the efficiency of the virtual array.

2. The non-transitory computer readable medium as set forth in claim 1, wherein determining an efficiency between the input throughput data rate and the output throughput data rate comprises instructions for:
    querying each host, coupled to the virtual array, to determine a throughput data rate for the corresponding host;
    aggregating the throughput data rates for the hosts to obtain the input throughput data rate;
    querying each physical storage unit in the backend array, coupled to the virtual array, to determine a throughput data rate for the corresponding physical storage unit to obtain the output throughput data rate; and
    determining the efficiency by generating a product of the input throughput data rate and the inverse function of the output throughput data rate.

3. The non-transitory computer readable medium as set forth in claim 2, wherein determining the efficiency further comprises instructions for determining the efficiency as a percentage of the storage operations that do not require access to the backend array.

4. The non-transitory computer readable medium as set forth in claim 1, further comprising instructions for:
    displaying the efficiency of a virtual array on a screen of a computer as a tool to manage the physical storage units, wherein: a high efficiency indicates that the output throughput data rate is low and the physical storage units does not require a high level of performance; and a low efficiency indicates that the output throughput data rate is high and the physical storage units require a high level of performance.

5. The non-transitory computer readable medium as set forth in claim 1, further comprising instructions for:
    displaying the efficiency of a virtual array on a screen of a computer as a tool to manage the virtual array, wherein a low efficiency indicates that the virtual array is not optimized for maximum efficiency.

6. The non-transitory computer readable medium as set forth in claim 1, further comprising instructions for:
    displaying the efficiency of a virtual array on a screen of a computer as a tool to manage the virtual array, wherein a high efficiency and a high maximum throughput data rate indicate that the physical storage units require a high level of performance.

7. The non-transitory computer readable medium as set forth in claim 1, further comprising instructions for:
    determining, using a computer, an efficiency for each of a plurality of virtual arrays; and
    displaying the efficiency of each virtual array on a screen of a computer, so as to permit comparison of efficiencies between one or more virtual arrays for analysis and troubleshooting.

8. The non-transitory computer readable medium as set forth in claim 2, wherein:
    querying each host comprises instructions for executing a function call on an application program interface ("API"), to each host, to obtain the throughput data rates; and
    querying each physical storage unit in the backend array comprises instructions for executing a function call on an application program interface ("API"), to each physical storage unit, to obtain the throughput data rates.

9. A storage system comprising:
    at least one host for requesting storage operations;
    at least one virtual array, coupled to the host, for receiving storage operations requests;
    a backend array, coupled to the virtual array, comprising physical storage, for storing data for the virtual array;
    at least one management server for:
        determining an input throughput data rate between the one host and the virtual array based on storage operations between the host and the virtual array;
        determining an output throughput data rate, from the virtual array to the backend array, wherein the output throughput data rate is based on the storage operations that require access to the backend array; and
        determining an efficiency between the input throughput data rate and the output throughput data rate so as to measure the efficiency of the virtual array.

10. The storage system as set forth in claim 9, wherein the management server further for:
    querying each host, coupled to the virtual array, to determine a throughput data rate for the corresponding host;
    aggregating the throughput data rates for the hosts to obtain the input throughput data rate;
    querying each physical storage unit in the backend array, coupled to the virtual array, to determine a throughput data rate for the corresponding physical storage unit to obtain the output throughput data rate; and
    determining the efficiency by generating a product of the input throughput data rate and the inverse function of the output throughput data rate.

11. The storage system as set forth in claim 9, wherein the management server further for determining the efficiency as a percentage of the storage operations that do not require access to the backend array.

12. The storage system as set forth in claim 9, wherein the management server further for:
    displaying the efficiency of a virtual array on a screen of a computer as a tool to manage the physical storage units, wherein: a high efficiency indicates that the output throughput data rate is low and the physical storage units does not require a high level of performance; and a low efficiency indicates that the output throughput data rate is high and the physical storage units require a high level of performance.

13. The storage system as set forth in claim 9, wherein the management server further for:
    displaying the efficiency of a virtual array on a screen of a computer as a tool to manage the virtual array, wherein a low efficiency indicates that the virtual array is not optimized for maximum efficiency.

14. The storage system as set forth in claim 9, wherein the management server further for:
displaying the efficiency of a virtual array on a screen of a computer as a tool to manage the virtual array, wherein a high efficiency and a high maximum throughput data rate indicate that the physical storage units require a high level of performance.

15. The storage system as set forth in claim 9, wherein the management server further for:
determining, using a computer, an efficiency for each of a plurality of virtual arrays; and
displaying the efficiency of each virtual array on a screen of a computer, so as to permit comparison of efficiencies between one or more virtual arrays for analysis and troubleshooting.

16. The storage system as set forth in claim 9, wherein the management server further for:
querying, using a computer, each host comprises executing a function call on an application program interface ("API"), to each host, to obtain the throughput data rates; and
querying, using a computer, each physical storage unit in the backend array comprises executing a function call on an application program interface ("API"), to each physical storage unit, to obtain the throughput data rates.

17. A method for determining an efficiency of a virtual array, the method comprising:
determining, using a computer, an input throughput data rate between at least one host and a virtual array based on storage operations between the host and the virtual array;
determining, using a computer, an output throughput data rate, from the virtual array to a backend array, comprising physical storage, of the storage operations, wherein the output throughput data rate is based on the storage operations that require access to the backend array; and
determining, using a computer, an efficiency between the input throughput data rate and the output throughput data rate so as to measure the efficiency of the virtual array.

18. The method as set forth in claim 17, wherein determining an efficiency between the input throughput data rate and the output throughput data rate comprises:
querying each host, coupled to the virtual array, to determine a throughput data rate for the corresponding host;
aggregating the throughput data rates for the hosts to obtain the input throughput data rate;
querying each physical storage unit in the backend array, coupled to the virtual array, to determine a throughput data rate for the corresponding physical storage unit to obtain the output throughput data rate; and
determining the efficiency by generating a product of the input throughput data rate and the inverse function of the output throughput data rate.

19. The method as set forth in claim 18, wherein:
querying each host comprises executing a function call on an application program interface ("API"), to each host, to obtain the throughput data rates; and
querying each physical storage unit in the backend array comprises executing a function call on an application program interface ("API"), to each physical storage unit, to obtain the throughput data rates.

* * * * *